United States Patent Office 3,048,651
Patented Aug. 7, 1962

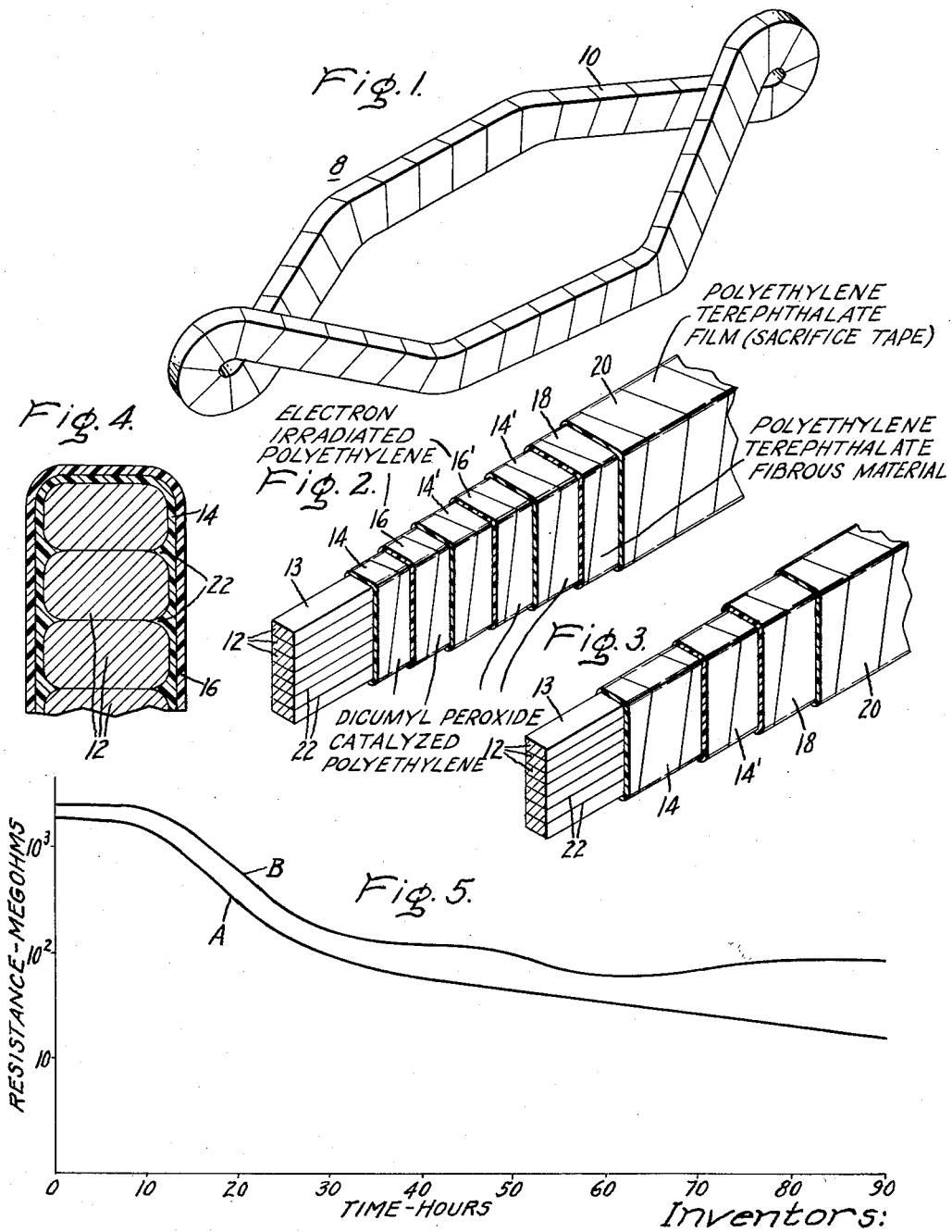

3,048,651
INSULATED COIL AND METHOD OF
MAKING SAME
Charles F. Howard, Scotia, and John J. Keane, Guilderland, N.Y., assignors to General Electric Company, a corporation of New York
Filed Aug. 2, 1957, Ser. No. 675,983
3 Claims. (Cl. 174—120)

The invention described herein relates to dynamo-electric machines and more particularly to an improved insulated coil capable of permitting operation of a motor in a contaminated atmosphere or while submerged in a liquid subjected to high pressure.

The invention described and claimed in application Serial No. 568,615, filed February 29, 1956 in the names of Harold Kitson, Jr., Walter L. Marshall and Henry E. Mazanek and assigned to the same assignee as the present invention, principally relates to a coil insulation system which permits operation of a motor under the conditions mentioned in the preceding paragraph. The invention described herein is an improvement over that disclosed in the filed application.

Prior to the development of electron irradiated polyethylene disclosed and claimed in the application of Elliott J. Lawton and Arthur M. Bueche, Serial No. 324,552, filed December 6, 1952 and assigned to the same assignee as the present invention, the electrical manufacturing industry was not capable of providing a motor adapted for submerged operation in a liquid, such as water, under high pressure for extended periods of time. The product resulting from practicing the Lawton et al. invention has high tensile and tear strength, resistance to acids, alkalies and water-borne chemicals, negligible water absorption and excellent electrical characteristics, thus making available a material having properties desirable for coil insulation purposes. Accordingly, Kitson et al. applied the Lawton et al. irradiated polyethylene to motor coils in the manner described in said application Serial No. 568,615, thereby providing a motor which has successfully and continuously operated in water at pressures in the neighborhood of 2000–3000 p.s.i., thus providing industry with its first motor for use under the above stated conditions.

While motors having coils insulated in accordance with the Kitson et al. teachings operate without trouble in adverse environments, production costs are higher than expected. It is to be noted that the problem is one of manufacture and not operation, since as above-mentioned, successful operation of the motor is established. The disadvantages result from certain stresses in the irradiated polyethylene insulation which, in some cases, cause it to split open during the curing cycle for the machine. These undesirable stresses are imparted to the irradiated polyethylene either when it is extruded to form the sheet insulating material, or when it is post-oriented prior to applying it to the coils; or during the coil taping operation. Exactly when and the degree of stress, in excess of that considered acceptable, is imparted to the material is not definitely known. The effects are apparent, however.

During the course of wrapping coils with the insulation and subjecting them thereafter to general factory handling including installation in the machine, the outer layer of irradiated polyethylene upon occasion becomes nicked so that small indentations or holes appear therein. These indentations apparently comprise one source of trouble since the heat applied to the finished machine during the curing cycle causes those sections wherein the indentations are located to split open, thus requiring removal of the affected coil for retaping. It has been observed that, in other instances, a coil having nicks in the insulation will split open at points remote from where the nicks are located, thus indicating that small indentations are not the sole source of trouble. Also, the combined effects of residual stresses and overheating of the insulated coils also result in a splitting at indeterminate points.

Observation of the electrical resistivity values of various types of insulating materials and systems applied to coils for use in motors operating in water or high humidity atmospheres shows that there is a progressive degradation of the insulating materials with the passage of time. This action is caused by liquid piercing the several layers of insulation and thus providing a leakage path for current normally flowing in the coils during machine operation. Another adverse effect resulting from the presence of water within the system is that it attacks the resinous insulation applied to the copper coils during manufacture.

Accordingly, the primary object of our invention is to provide a restraining force to irradiated polyethylene coil insulation capable of preventing tear propagation during heating cycles while simultaneously furnishing an armor coating resistant to abuses suffered during general factory handling.

Another important object of our invention is to provide an insulated coil with an inner non-permeable shield effective in isolating the current-carrying coil from the environment in which it operates, while simultaneously improving the electrical resistivity properties of the coil insulation system.

In carrying out our invention, we apply a base layer of dicumyl peroxide catalyzed polyethylene to a coil conductor with alternate overlayers of electron irradiated polyethylene and the catalyzed polyethylene. Polyethylene terephthalate fibrous material consisting of a tape of grid-like configuration having small openings between crisscrossed fibers in the material is then wrapped on the coil, followed by a sacrifice taping of polyethylene terephthalate film. Upon application of heat to the insulated coil, the polyethylene terephthalate film exerts a force on the layers therebeneath, causing the base layer of catalyzed polyethylene to become viscous and be forced into the void spaces between the first layer of insulation and the coil body. Concurrently with this action, the force created by the contracting film causes another of the layers of catalyzed polyethylene to become viscous and, upon cooling, forms a shield or barrier impervious to the penetration of liquid. Also, the layer of catalyzed polyethylene immediately beneath the polyethylene terephthalate fibrous material is caused to impregnate the grid-like structure of the fibrous material, thereby resulting in a product having a strong and protective armor coating, in addition to providing a basic insulation system having desirable electrical characteristics.

While the specification concludes with claims particularly pointing out and distinctly claiming the subject matter which we regard as our invention, it is believed the invention will be better understood from the following description taken in connection with the accompanying drawing in which:

FIGURE 1 is a perspective view of a finished coil having insulation comprising the invention;

FIGURE 2 is a perspective view of a portion of the coil shown in FIGURE 1 illustrating the various layers of material comprising the insulation for the coil; and FIGURE 3 is a modification of the insulation system shown in FIGURE 1.

FIGURE 4 is an enlarged sectional view illustrating how the catalyzed polyethylene fills voids between adjacent conductor segments during the process of curing the insulated coil; and FIGURE 5 is a chart illustrating insulation resistance versus time values for a prior art insulation system and that disclosed in this application.

Referring now to the drawing wherein like reference characters designate like or corresponding parts throughout the several views, there is shown in FIGURE 1 a form wound coil 8 for a dynamoelectric machine having a plurality of layers of insulation 10 applied to its outer surface. As illustrated in FIGURE 2, the current conducting portion of the coil comprises a plurality of rectangular shaped copper segments 12 having a coating of conventional resinous type insulation 13 applied to their outer surfaces. A plurality of layers of insulating material are wrapped thereon to form an insulation system capable of permitting operation of the machine in adverse environments. The insulation system comprises a base layer of dicumyl peroxide catalyzed polyethylene 14 having an overlayer of electron irradiated polyethylene 16. Alternate layers of catalyzed polyethylene 14' and irradiated polyethylene 16' are then applied to the conductor. These layers of insulation may be wrapped in a manner to provide a butt joint or lapped onto one another with one or more layers according to the amount of insulation required for a particular coil. Polyethylene terephthalate fibrous material 18 is applied over the outermost layer of catalyzed polyethylene and followed by a sacrifice taping of post-oriented polyethylene terephthalate film 20.

Coils wrapped in the manner described above are then placed in an oven, subjected to a vacuum, and heated for a predetermined period of time, during which the polyethylene terephthalate film, by virtue of its force of recovery properties, exerts a great force on the layers of insulation disposed therebeneath. The action that takes place during this time results from a property of the catalyzed polyethylene in that it will assume a viscous state when subjected to heat and the pressure applied by the polyethylene terephthalate film. As a result, the first layer of catalyzed polyethylene appearing adjacent the copper surface of the conductors 12 is caused to fill the voids or re-entrant portions 22, as shown in FIGURE 4, formed by the rounded contour of each segment 12 when they are placed adjacent one another to form the complete coil. The resinous insulating material 13 is preferably selected so that it will be compatible with the catalyzed polyethylene and therefore exhibit a bonding action between the two. Since the catalyzed polyethylene is effective in filling all voids of the conductor, including naturally recurring indentations therein, and since it has a property of very low water absorption, it completely encloses the conductor, thereby encapsulating the coil in a continuous sheath. The primary advantage derived from utilizing the above-described properties of the catalyzed polyethylene, and in taping it on the coil in the manner described, is that it precludes the possibility of vapor piercing this layer of insulation and condensing to a liquid, with consequent damage to the coating of insulating material 12 and eventual lowering of the insulation resistance, which would otherwise occur.

Concurrent with the action described above, the second and third layers of catalyzed polyethylene are also caused to assume a viscous state when heated and subjected to the force created by the polyethylene terephthalate film, and since the force is uniform throughout the complete length of the coil, the material is caused to be uniformly dispersed between the adjacent layers of irradiated polyethylene. When the coil is subsequently cured by heating and then cooled, the layers of catalyzed polyethylene assume a new state wherein they form complete sheaths or barriers which are non-permeable by water or aqueous solutions. The catalyzed polyethylene also has an affinity for the irradiated polyethylene so that a bonding action occurs between these insulating materials which is not subject to delamination as they age on the coil. A resultant advantage derived from the providing of a sheath or barrier within the insulation system is that it improves the electrical resistivity of the insulation so that it does not continue to drop off in value with the passage of time.

Referring to FIGURE 5 illustrating the relative resistivity values of a coil insulated in accordance with the teachings in this invention, and that of a coil insulated in a manner of the prior art, it will be seen that the resistance values of the insulating material in both cases drops off to a predetermined amount within a very short period of time, for example, thirty-six hours before it starts to level out to a consistent value. Curve A shows that after the initial drop in resistance values, there is a very slow but consistent drop in insulation resistance as it ages on a coil. By comparison, it will be seen that a coil insulated in the manner of this invention, as shown by curve B, maintains consistent resistance values as time progresses. The consistent resistance values thus achieved are attributed directly to the provision of a single or plurality of sheaths provided by the catalyzed polyethylene in the insulation system.

The last step of equal importance in the process of insulating the coil described herein is that the exertion of force by the polyethylene terephthalate film causes the layer of catalyzed polyethylene located immediately thereto beneath to impregnate the polyethylene terephthalate fibrous material, thus filling all voids in its grid-like structure and thereby providing an outer coating of armor which also exhibits electrical insulating properties. The armor is effective in protecting the insulating layer because of its high abrasive and cut-through resistance, thereby permitting it to withstand abuse received in factory handling, and particularly when the coils are being installed in the motor, since this is the occasion during which the insulation of said Kitson et al. application becomes nicked and otherwise damaged. Another function served by the armor is that it eliminates the necessity for providing slot tubes heretofore required when coils having insulation of the type disclosed in the Kitson et al. application were installed in the stator slots.

In lieu of providing a separate layer of catalyzed polyethylene adjacent the polyethylene terephthalate fibrous material, the catalyzed polyethylene may be applied to the polyethylene terephthalate fibrous material prior to installing the latter on the coil. In this instance, the material takes on the characteristics of a single layer of material, rather than that of the laminar type since the catalyzed polyethylene completely impregnates the spaces provided in the fibrous material. It will be apparent that in some instances the fibrous material—catalyzed polyethylene single layer of material—may constitute the sole insulation on the coil, particularly where the coil voltages are not great.

Substitutes for the irradiated polyethylene may consist of those hydrolytically stable films such as polyvinyl chloride and polyvinylidene and copolymers of these two, polytetrafluoroethylene, polychlorotrifluoroethylene, polyethylene, butadiene, isobutadiene, and the like.

Any material having insulation qualities, such as polyethylene, and being capable of converting into a viscous state when subjected to heat and the pressure supplied by an outer or a sacrifice taping, may be substituted for the catalyzed polyethylene. Obviously, the heat and pressure may be supplied by a closed container.

Any fabric except regenerated cellulose may conveniently be utilized in lieu of the polyethylene terephthalate fibrous material so long as it is hydrolytically stable, is physically strong and capable of being impregnated. Examples are cotton, glass, nylon, and the like.

The post-oriented polyethylene terephthalate film has proven exceptionally capable of supplying the necessary shrinkage force for causing impregnation of the fibrous material by the catalyzed polyethylene. Other materials having properties of high shrinkage force, mechanical strength and oxidation stability may serve as substituted. For example, thermally stable rubber, such as silicone rubber, post-oriented electron irradiated polyethylene, and oriented polyvinyl chloride.

Since the compressive force provided by the polyethylene terephthalate film should preferably be applied equally to the insulation, no particular problems in this respect are encountered when the conductor is of round or elliptical shape. However, in the case of flat conductors of rectangular cross section, it is necessary to provide wood blocks of semi-elliptical configuration between the polyethylene terephthalate film and the flat surface of the conductor, so as to obtain the application of a force perpendicular to the conductor flat surface. It will be apparent that in the absence of such a supplementary tool, a force could not be imparted to the insulation lying in a plane parallel to the flat surface.

It has been found that when the material used to impregnate the fibrous material infiltrates therethrough and appears on a side thereof opposite from the conductor, it occasionaly presents a sticky or tacky surface, thus restricting the polyethylene terephthalate film in carrying out its shrinkage function. In such cases, an additional layer of the same film may be provided to eliminate this problem. Also, any material not having an affinity for the impregnant may be used.

In view of the above, it will be apparent that many modifications and variations are possible in light of the above teachings. The primary concept is that of providing an armor for a basic insulation system capable of protecting it from damage while simultaneously displaying an insulating function. Another concept of equal importance is the provision of a sheath or barrier in the insulation system which is impervious to the passage of liquid. The primary advantage derived from this structure is that the resistance of the insulation to passage of current remains the same with the passage of time. It will be obvious that a different number of layers of insulating material may be employed in accordance with the degree of dielectric strength required for a particular coil being insulated. Also, it will be evident to those skilled in the art that although an insulation system disclosing specific materails has been described, it will be apparent that other materials having comparable insulating qualities may readily serve as substitutes. It therefore is to be understood that within the scope of the following claims, the invention may be practiced otherwise than as specifically described.

What we claim as new and desire to secure by Letters Patent of the United States is:

1. The method of insulating an electrical conductor comprising the steps of applying a base layer of insulation on said conductor, said base layer being capable of flowing when subjected to heat and pressure during curing, and then wrapping on a permeable overlayer of material having insulating abrasion resistant properties followed by a sacrifice taping of material possessing force of recovery characteristics, heating said conductor with its layers of insulation to a temperature where said sacrifice taping shrinks and exerts a force on said base layer thereby causing it to become fluid and fill any indentations on said conductor while simultaneously impregnating said overlayer of material to provide an outer covering having abrasion resistant and insulating qualities, and finally removing said sacrifice taping.

2. The method of insulating an electrical conductor comprising the steps of applying a first layer of insulation impermeable to the penetration of liquid on said conductor, wrapping a second layer of insulation on said first layer followed by an overlayer of insulation having the same properties as said first layer, applying a fourth layer of insulation on said overlayer, and a fifth layer having the same properties as said first layer on said fourth layer, wrapping an insulating material having abrasion resistant qualities on said fifth layer, followed by an outer covering of a material having force of recovery characteristics, heating said conductor with its several layers of insulation at a temperature sufficient to cause said outer covering to shrink and exert a compressive force on said layers located therebeneath, thereby causing said first layer of insulation to convert to a viscous state and thus fill all cavities in said conductor and be uniformly distributed between said conductor and said second layer, said heat and compressive force causing said third layer to assume a viscous state and, upon cooling, form a homogeneous layer of insulation between said second and fourth layers, and also causing said fifth layer to impregnate said layer of abrasion resistant material to provide an armor with insulating characteristics, and finally removing the material having force of recovery characteristics from said conductor.

3. An insulated conductor comprising a bar of current conductive material having a base layer of dicumyl peroxide catalyzed polyethylene uniformly distributed on its outer surface, an overlayer of irradiated polyethylene followed successively by a homogeneous second layer of catalyzed polyethylene and irradiated polyethylene, a layer of dicumyl peroxide catalyzed polyethylene on said irradiated polyethylene and an outer grid-like armor of fibrous polyethylene terephthalate, said catalyzed polyethylene filling all the voids and indentations on said conductor and being uniformly disposed between said layers of irradiated polyethylene and firmly bonded to the conductor and said layers of irradiated polyethylene as a result of being converted to a viscous state when subjected to heat and pressure during the insulating cycle, said catalyzed polyethylene further being disposed in the openings provided by said fibrous polyethylene terephthalate thereby to provide a combined sheathing of armor and insulation effective in preventing the passage therethrough of a liquid and providing protection to the layers of insulation therebeneath.

References Cited in the file of this patent

UNITED STATES PATENTS

| | | |
|---|---|---|
| 2,195,233 | Boyer | Mar. 26, 1940 |
| 2,269,185 | Dawson | Jan. 6, 1942 |
| 2,533,501 | Pendleton | Dec. 12, 1950 |
| 2,656,290 | Berberich | Oct. 20, 1953 |
| 2,691,694 | Young | Oct. 12, 1954 |
| 2,798,899 | Crandall | July 9, 1957 |
| 2,836,744 | Clawson | May 27, 1958 |

FOREIGN PATENTS

| | | |
|---|---|---|
| 599,097 | Great Britain | Mar. 4, 1948 |
| 620,949 | Great Britain | Apr. 1, 1949 |

OTHER REFERENCES

Plastics Bulletin (Du Pont publication), No. 46, vol. 12, 1950, page 185.